Patented Nov. 27, 1928.

1,693,461

UNITED STATES PATENT OFFICE.

GRIGORI PETROFF, OF MOSCOW, UNION OF SOVIET SOCIALIST REPUBLICS.

PROCESS FOR THE PRODUCTION OF THE CONDENSATION PRODUCTS OF PHENOLS WITH ALDEHYDES.

No Drawing. Application filed April 23, 1927, Serial No. 186,182, and in Union of Soviet Socialist Republics December 20, 1926.

The present invention relates to a process for the production of the liquid condensation products, soluble in resin solvents, of phenols with formaldehyde (resols) as well as also the conversion of the same into non-fusible and insoluble condensation products.

The process for the production of such products according to the present invention differs from the processes hitherto known in that the first stage of the production of the resols from phenols or cresols takes place in the presence of the sodium salt of toluene-sulphone-chloramide

which in these circumstances acts as a catalyst. The toluene-sulphone-chloramide splits up in the presence of water as follows:—

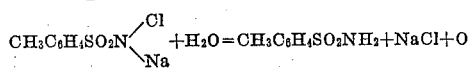

The use of the toluene-sulphone-chloramide in the production of the resols has a number of advantages as compared with the acid or basic catalysts hitherto proposed. These advantages are as follows:—

(1) Resols are obtained with the whole quantity of formaline, which are converted also without the addition of acid or basic catalysts into a non-fusible insoluble product, the evaporation of the water at 60–70° C. being rendered possible without any risk of hardening as is the case with the catalysts mentioned above.

(2) The initial product of condensation obtained in this manner can be converted simply by heating into a non-fusible product; this reaction may be accelerated by the admixture of acid or basic reagents. These reagents must in such a case dissolve in the resol resin at as low a temperature as possible, in order to prevent too energetic a reaction. This is effected by introducing the acid catalysts in the form of an alcohol solution, such as for instance a solution of amyl alcohol, propyl alcohol, glycerine, glycol or in the form of a solution in chlor-substituted hydrocarbons such as tetra-chloro-ethane, or in fatty acids, while the alkaline catalysts may be in the form of the alcohol solutions of the glycerates, phenolates and the like.

*Example.*—100 parts of commercial 97% carbolic acid. 100 parts of 40% formaline. 2 parts of the sodium salt of toluene-sulphone-chloramide.

When heated with a reflux condenser, water separates out. Water is eliminated from the initial product of condensation by evaporation. A viscous varnish-like mass is obtained. Into this mass there is introduced at an ordinary temperature one per cent by weight of octo-hydro-anthracene-sulpho acid dissolved in 4 parts of a mixture of ethyl alcohol with glycerine (two parts of each).

After the introduction of the acid catalyst the mass is left to stand, hardens and is thereupon fixed by heating. When a basic catalyst is introduced a similar procedure is adopted. A saturated ethyl alcohol solution (20–25%) of caustic soda is prepared, 20% glycerine added to the solution, a part of the alcohol distilled off and the solution of caustic soda obtained in this manner used as catalyst. For industrial purposes the known preparation "Aktivin" (sodium salt of toluene-sulphone-chloramide) may be used as basic catalyst.

Having now particularly described and ascertained the nature of my said invention and in what manner the same is to be performed, I declare that what I claim is:—

1. In the process of preparing phenol-formaldehyde condensation products, the step which comprises condensing a phenol with formaldehyde in the presence of the sodium salt of toluene-sulphone-chloramide.

2. The process of preparing phenol-formaldehyde condensation products, which comprises preliminarily condensing a phenol with formaldeyde in the presence of the sodium salt of toluene-sulphone-chloramide to form a viscous mass and thereafter continuing the condensation in the presence of a catalyst to form a hard condensation product.

In testimony whereof I have signed my name to this specification.

GRIGORI PETROFF.